US011329997B2

(12) United States Patent
Goldstein

(10) Patent No.: US 11,329,997 B2
(45) Date of Patent: May 10, 2022

(54) SIGNED MESSAGE HEADER STORING SENDER ACCOUNT AUTHENTICATION METHOD

(71) Applicant: ValiMail Inc., San Francisco, CA (US)

(72) Inventor: Peter Martin Goldstein, San Francisco, CA (US)

(73) Assignee: ValiMail Inc., San Francisco, CA (US)

( * ) Notice: Subject to any disclaimer, the term of this patent is extended or adjusted under 35 U.S.C. 154(b) by 270 days.

(21) Appl. No.: 16/663,028

(22) Filed: Oct. 24, 2019

(65) Prior Publication Data
US 2020/0137081 A1 Apr. 30, 2020

Related U.S. Application Data

(60) Provisional application No. 62/752,896, filed on Oct. 30, 2018.

(51) Int. Cl.
*H04L 9/32* (2006.01)
*H04L 29/06* (2006.01)
*G06Q 10/10* (2012.01)
*H04L 51/48* (2022.01)
*H04L 51/23* (2022.01)

(52) U.S. Cl.
CPC ......... *H04L 63/126* (2013.01); *G06Q 10/107* (2013.01); *H04L 51/28* (2013.01); *H04L 51/30* (2013.01); *H04L 63/083* (2013.01); *H04L 63/0807* (2013.01); *H04L 63/0823* (2013.01); *H04L 63/0861* (2013.01)

(58) Field of Classification Search
CPC ............... H04L 63/126; H04L 63/0861; H04L 63/0823; H04L 63/0807; H04L 63/083; H04L 51/28; H04L 51/30; G06Q 10/107
See application file for complete search history.

(56) References Cited

U.S. PATENT DOCUMENTS

| 7,873,996 B1 * | 1/2011 | Emigh .................... H04L 51/12 726/22 |
| 9,781,149 B1 * | 10/2017 | Himler .................... H04L 51/12 |
| 2006/0156385 A1 | 7/2006 | Chiviendacz et al. |

(Continued)

OTHER PUBLICATIONS

PCT International Search Report and Written Opinion, PCT Application No. PCT/US2019/057928, dated Jan. 15, 2020, 13 pages.

*Primary Examiner* — Richard G Keehn
(74) *Attorney, Agent, or Firm* — Fenwick & West LLP

(57) ABSTRACT

A delivering email system is configured to receive a request to send an email to a recipient, identify an authentication method of a sender account for the email, modify email headers of the email to include an indication of the authentication method, generate digital signatures for the email that include the email headers within a scope of the digital signatures, modify the email such that an email header of the email includes the digital signatures, and transmit the email, including the indication of the authentication method and the digital signatures, to the recipient at a receiving email system. The receiving email system is configured to receive the email, determine that the email headers are unaltered by validating the digital signatures against a public key of the sender domain, determine whether the authentication method indicated meets a criteria, and execute a security response against the email if not.

43 Claims, 6 Drawing Sheets

(56) References Cited

U.S. PATENT DOCUMENTS

| | | | |
|---|---|---|---|
| 2006/0200523 A1* | 9/2006 | Tokuda | H04L 51/12 709/206 |
| 2012/0331074 A1* | 12/2012 | Fox | H04L 51/18 709/206 |
| 2014/0208104 A1* | 7/2014 | Yoon | H04L 9/3247 713/168 |
| 2014/0282834 A1* | 9/2014 | Guinan | H04L 63/0823 726/1 |
| 2016/0087957 A1 | 3/2016 | Shah et al. | |
| 2016/0173521 A1 | 6/2016 | Yampolskiy et al. | |
| 2016/0277336 A1 | 9/2016 | Sachtjen et al. | |
| 2016/0379005 A1 | 12/2016 | O'Hare et al. | |
| 2018/0191499 A1* | 7/2018 | Sachtjen | G06Q 10/107 |
| 2019/0173890 A1* | 6/2019 | Deka | H04L 63/08 |

* cited by examiner

```
From: Bob (bob@acme.com)
Subject: article: Email with authentication method header
Date: January 01, 1970 00:00:00 UTC
To: alice@ajax.com
Return-Path: <bob@acme.com>
Envelope-To: alice@ajax.com
Delivery-Date: Tue, 01 Jan 1970 00:00:00 +0000
Received: from xx-out-xxxx.acme.com ([111.111.111.111]:11111) by
xx.xx.ajax.com with esmtp (Exim 1.11) (envelope-from
<bob@acme.com>) id xxxxxx-xxxxxx-xx for alice@ajax.com; Thu, 01
Jan 1970 00:00:00 +0000
Received: by xx-out-xxxx.acme.com with SMTP id xxxxxxxxxxxx.1 for
<alice@ajax.com>; Thu, 01 Jan 1970 00:00:00 +0000
Received: by 222.222.222.222 with SMTP id
xxxxxxxxxxxx.111.111111111; Thu, 01 Jan 1970 00:00:00 +0000
Received: by 222.222.222.222 with HTTP; Thu, 01 Jan 1970 00:00:00
+0000
```
X-Security: v=1; m=2fa; f1=pass; f2=RSA_token; c1=retry; retry=5; c2=pass_complex; pass_complex=upper:num;
Dkim-Signature: v=1; a=rsa-sha256; c=relaxed/relaxed; d=acme.com; s=gamma; h=domainkey-signature:received:received:message-id:date:from:to:subject:mime-version:content-type:x-security; bh=_[signature]_
```
Domainkey-Signature: a=rsa-sha1; c=nofws; d=acme.com; s=gamma;
h=message-id:date:from:to:subject:mime-version:content-type;
```
b=_[signature]_
```
Message-Id: <xxxxxxxxxxxx@mail.acme.com>
Mime-Version: 1.0
Content-Type: multipart/alternative; boundary="----
=_Part_xxxx_111111111.222222222"
Message Body: This message includes a signed header element that
indicates the authentication method of the user who sent the
email.
```

FIG. 5

SIGNED MESSAGE HEADER STORING SENDER ACCOUNT AUTHENTICATION METHOD

CROSS-REFERENCE TO RELATED APPLICATIONS

This application claims the benefit of U.S. Prov. App. No. 62/752,896, filed Oct. 30, 2018, which is hereby incorporated by reference herein in its entirety.

TECHNICAL FIELD

The disclosure generally relates to the field of electronic messaging, and specifically to a signed message header storing an authentication method of a sender account of the message.

BACKGROUND

When a recipient receives an electronic message, such as an email, the message indicates the identity of the sender of the message (e.g., in a "From" address). The recipient may perform some action based on a relationship between the recipient and the sender indicated in the message. This may include reading the message, discarding the message, replying to the message, and so on. The recipient may perform some action if he or she has some relationship or knowledge of the sender, and may perform a different action if he or she has no knowledge of the sender. For example, a recipient may read a message that indicates that a colleague is the sender, while the recipient may discard an email with an unknown (e.g., spam) sender.

However, such a system presents a potential security flaw. The recipient inherently trusts the identity indicated in the sender of the message, and while existing security features of electronic messages may reasonably ensure that the message was sent from a computing device with access to the account of the sender, there is not necessarily a guarantee that the user that has accessed the sender's account to send the message is actually the sender. For example, a malicious actor may be able to gain unauthorized access to the sender's account, and send messages to a recipient using the sender's account. To the recipient, the message appears to have been from the sender, and but in reality, the message was not sent by the actual sender.

The ease in which a malicious user may be able to access a sender's account may depend upon the authentication method that is utilized with the sender's account to authorize the sender for access to the account. Certain authentication methods may be more difficult to attack for a malicious user, and therefore indicate a higher likelihood that a user sending messages from accounts with these authentication methods is the actual user that is associated with the account (i.e., the actual sender).

Hence, what is lacking, inter alia, is an ability for a recipient of an electronic message to determine the likelihood that the electronic message, which was received from a sender, was actually sent by a user having legitimate access to the account of the sender.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 5 is an example of a message header including a digital signature and a header element indicating the authentication method of the sender's account, according to one example embodiment.

DETAILED DESCRIPTION

Figure 1:
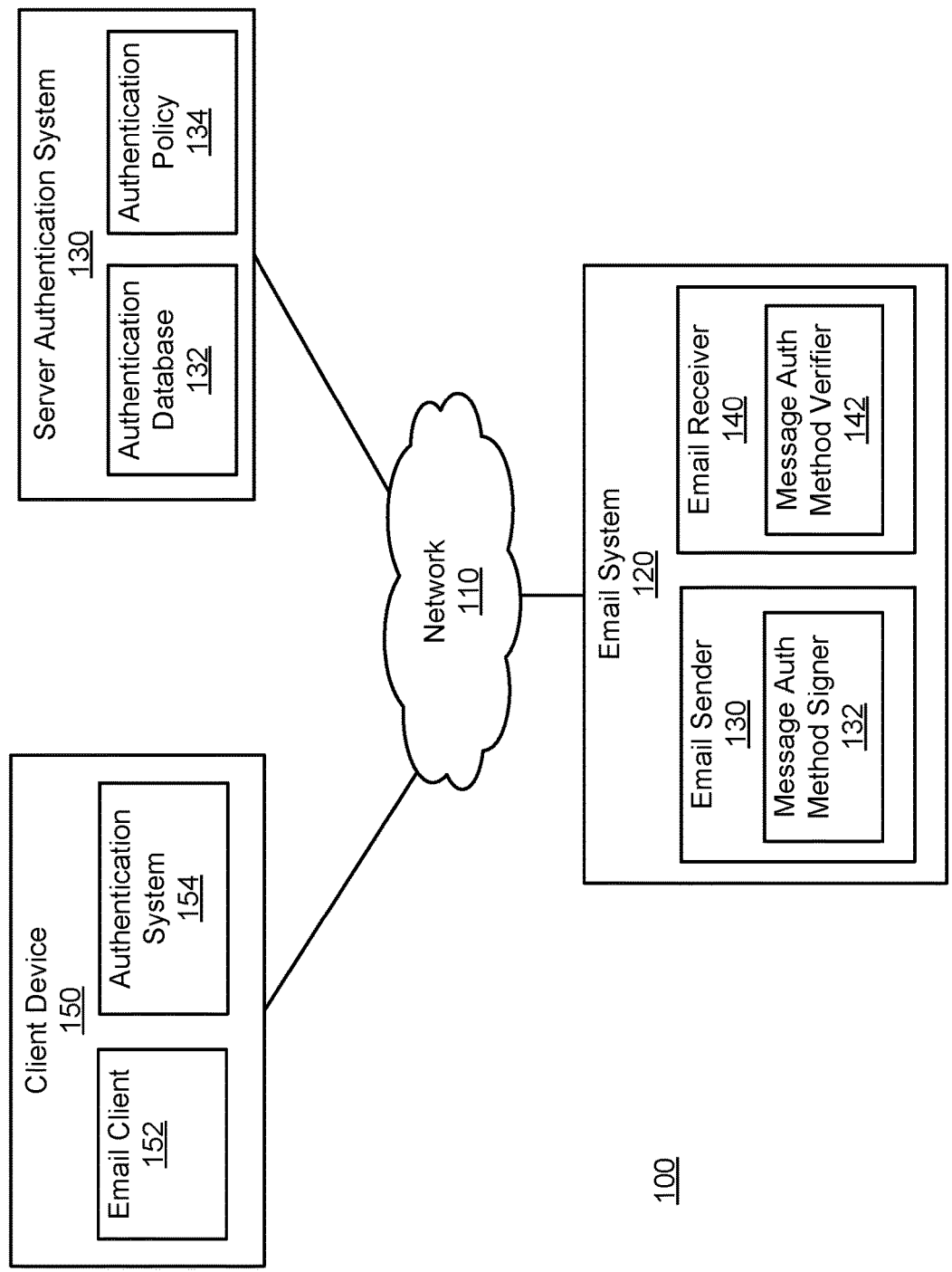
FIG. 1 illustrates an exemplary system for sending and receiving a signed message header storing an authentication method of a sender account of a message, according to an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed herein in one embodiment is a system, comprising a delivering email system configured to receive a request from a sender to send an email to a recipient, identify an authentication method of a sender account for the email, modify one or more email headers of the email to include an indication of the authentication method, generate one or more digital signatures for the email that include the one or more email headers within a scope of the one or more digital signatures, modify the email such that an email header of the email includes the one or more digital signatures, and transmit the email, including the indication of the authentication method and the one or more digital signatures, to the recipient at a receiving email system. The receiving email system configured to receive the email having the one or more email headers indicating the authentication method of a sender account of the email and the one or more digital signatures of the one or more email headers, determine that the one or more email headers are unaltered by validating the one or more digital signatures against a public key of the sender domain of the email, determine whether the authentication method indicated in the one or more email headers meets a criteria, and execute, in response to the authentication method failing the criteria, a security response against the email.

In one embodiment, the authentication method comprises at least one of: 1) entering a username and password, 2) entering a key from a token, 3) entering a key provided by an external security system, 4) retrieving authentication credentials from a password vault, 5) answering one or more questions, 7) using a hardware or software authentication device, 8) using a certificate file, 9) submitting biometric information, 10) a challenge/response protocol, and any combination thereof.

In one embodiment, the receiving email system is further configured to associate, in response to a determination that the one or more email headers are altered by validating the one or more digital signatures against a public key of the sender domain of the email, a flag with the email indicating that the email failed the validation of the one or more digital signatures.

In one embodiment, the receiving email system is further configured to send, in response to a determination that the one or more email headers are altered by validating the one or more digital signatures against a public key of the sender domain of the email, an alert to a system administrator.

In one embodiment, the authentication method meets the criteria when a security level of the authentication method is above a threshold level, the security level indicating a likelihood of the authentication method being compromised by a malicious attacker.

In one embodiment, the security response includes additional security checks to determine whether the email was actually sent by the user associated with the user account indicated in a sender address of the email.

In one embodiment, the indication of the authentication method further includes an indication of one or more configuration settings associated with the authentication method, the one or more configuration settings indicating at least one of: 1) a maximum limit on the number of retries, 2) mandatory delay period between retries, 3) a time of day in which user authentication is allowed, 4) whether each authentication attempt is logged, 5) complexity requirements for the authentication method, and 6) expiry periods, and wherein the security response is modified based on the indication of the one or more configuration settings.

In one embodiment, the delivering email system is further configured to receive information regarding the authentication method, convert the authentication method information to a standard format based on a set of one or more rules that indicates a type of indicator to use for each element of the information of the authentication method. The standard format is based on a lookup table, and the lookup table indicates a value for each authentication method. The delivering email system modifies the email header of the email to include as the email header element the converted authentication method information.

In one embodiment, the delivering email system is further configured to generate a hash of the one or more email headers that includes the indication of the authentication method, and encrypt the hash with a private key to generate the one or more digital signatures. The hash can be decrypted using a public key stored at publicly verifiable location of the sender domain of the delivering email system.

In one embodiment, the receiving email system is further configured to access the public key of the delivering email system from the publicly verifiable location, decrypt the one or more digital signatures using the public key to generate an unverified hash, and match the unverified hash against a currently generated hash of the one or more email headers of the email to determine that the one or more email headers, including the indication of the authentication method, is unaltered.

In one embodiment, the digital signature is further generated of a body of the email, and the receiving email system is further configured to match the unverified hash against a currently generated hash of the body of the email to determine that the body of the email is unaltered.

In one embodiment, the receiving email system is further configured to access a response database that stores one or more security responses for each authentication method select the one or more security responses in the response database associated with the one or more authentication methods indicated in the email header, and execute the selected one or more security responses.

In one embodiment, the receiving email system is further configured to access a database of security scores, each security score in the database associated with a selected authentication method, the database generated by analyzing historical data indicating hijacked user email accounts and selected authentication methods associated with those user email accounts, assigning a security score to the selected authentication method based on a number of hijacked user email accounts that are associated with the selected authentication method. The receiving email system determines a security score associated with the authentication method indicated in the email header element, and selects the security response for execution based on a value of the security score.

Exemplary System for Sending and Receiving a Signed Message Header Storing an Authentication Method of a Sender Account FIG. 1 illustrates an exemplary system for sending and receiving a signed message header storing an authentication method of a sender account of a message, according to an example embodiment. The system 100 includes a network 110, an email system 120, server authentication system 130, and one or more client devices 150 (generally, client device 150). Although the illustrated system 100 includes the elements shown in FIG. 1, in other embodiments the system 100 may include different elements or a different number of elements. For example, there may be multiple email systems 120 (each owned by a different organization). Furthermore, the functionalities of each element may be distributed differently among the elements in other embodiments.

Network

The network 110, which can be wired, wireless, or a combination thereof, enables communications among at least the elements shown, and may include the Internet, a LAN, VLAN (e.g., with VPN), WAN, or other network. For example, some of the elements, such as the client device 150 and email system 120, may communicate with each other using a LAN, making at least some of the communications between these entities hidden to the external WAN or Internet with which the other elements are connected. In one embodiment, the network 110 uses standard communications technologies and/or protocols, such as Hypertext Transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

Client Device

The client device 150 allows a user to access an email account for the user to send and receive electronic messages, such as emails. The client device 150 may comprise a computing system such as the computing system described with reference to FIG. 6.

The client device 150 includes an email client 152 to interface with the email system 120. The email client 152 allows a user to send and receive emails from the user's account. The email client 152 may be a web browser, client application, or other interface which communicates with the email system to allow a user of the client device 150 to access the user's account. In the case where the email client 152 is a web browser, the email system 120 may provide a web interface to allow the web browser to access the user's email account via the web interface. The actual emails, and other related data may be stored at the client device 150, such as in a cache, etc., or externally, e.g., at the email system 130.

The client device 150 has an authentication system 154 to authenticate the user before the user is allowed to access the user's email account via the email client 152. The authentication system 154 may utilize various authentication methods in order to authenticate the user. These authentication methods may include 1) entering a username and password, 2) entering a key from a token, 3) entering a key provided by an external security system, 4) retrieving authentication credentials from a password vault, 5) answering one or more questions (e.g., questions which only the user knows the answer to), 7) using a hardware or software device (e.g., a Bluetooth device, smart card, etc.), 8) using a certificate file, 9) submitting biometric information (e.g., a fingerprint, iris scan, face scan), 10) using a combination of individual authentication methods (e.g., such as those described here) in a multi-factor authentication process, and so on.

The particular authentication method used by the authentication system 154 may depend upon the configuration of the organization to which the user belongs, a configuration setting made by the user to choose a particular authentication method, physical limitations of the client device 150 (e.g., the client device may not allow biometric inputs or be able to scan a smart card), and so on.

The authentication system 154 may also be configured with other configuration settings on the authentication method, such as a maximum limit on the number of retries, mandatory delay period between retries, a time of day in which user authentication is allowed, whether each authentication attempt is logged, complexity requirements for the authentication method (e.g., password complexity requirements), password expiry periods, and so on.

The overall configuration of the authentication system 154, including the type of authentication method used, and the other configuration settings such as the number of retries, may imply a certain security level of the authentication system 154 for the client device. The security level of the authentication system 154 indicates how likely it is to be compromised by a malicious attacker. For example, a higher security level can indicate a more secure system which is less likely to be compromised. Conversely, certain authentication methods may have a lower level of security, meaning that a malicious user may be more easily able to bypass the authentication method. For example, an authentication method that utilizes a fingerprint only may be easily bypassed with the help of a copy of said fingerprint. However, a multi-factor authentication method combining, for example, password entry, key entry from a hardware token, and so on, may have a high level of security as a malicious user would not easily be able to bypass such a combination of authentication methods. Although the authentication system 154 is shown to be executing on the client device 150 in FIG. 1, in other embodiments the authentication system 154 may execute on an external system, and/or may also access an external authentication server or database (e.g., a user account management system of an organization), such as the server authentication system 130.

Server Authentication System

The server authentication system 130 may perform authentication for users of the client device. The server authentication system 130 may comprise a computing system such as the computing system described with reference to FIG. 6, and may be a component within a computer network of an organization. The users of this organization may send emails from addresses with a common domain name. In one embodiment, the server authentication system 130 receives authentication information from the client device 150 and verifies this information with a central database, such as the authentication database 132. This authentication information may include any information that the user has input as part of the authentication process. The authentication information may be received from the authentication system 154 of the client device 150. If the verification is successful, the server authentication system 130 responds to the client device 150 to allow the user to access resources, such as to access the email client 152, and access to the email system 120. The server authentication system 130 may restrict the type of authentication methods that are allowed to authenticate users in the organization based on an authentication policy 134, which may be configured by a system administrator. The authentication policy 134 may also include information on the configuration settings for the allowed authentication methods. These configuration settings may additionally include information about the security of the communication between the client device 150 and the server authentication system 130, such as whether data is encrypted, the type of encryption scheme used, the type of authentication protocol used, and so on.

An example of a system using the server authentication system 130 is any type of challenge/response authentication method. In this method, the server authentication system 130 transmits the challenge to the client device 150. The client device 150 transmits a response in response to the challenge. The response may be based on a user input or may be computed by the client device 150 using some other function. If the server authentication system 130 verifies that the response is valid, the server authentication system 130 may transmit a message to the client device 150 to grant the user access. The server authentication system 130 may also transmit a message to the email system 120 to grant the user access to the user's account for the email system 120. An example of a challenge/response authentication method is CHAP (Challenge-Handshake Authentication Protocol).

Email System

The email system 120 sends and receives emails on behalf of one or more user accounts (i.e., user email accounts). In one embodiment, the email system 120 comprises one or more computing systems, which may be configured similarly to the computing system described with reference to FIG. 6. In another embodiment, the email system 120 may be a component of a cloud-based system and may execute on one or more computing systems of a cloud infrastructure provider. The email system includes an email sender 130 and an email receiver 140.

The email sender 130 send emails to recipients indicated in the emails in response to requests from the email clients 152 or to other entities, such as a mailing list system. In one embodiment, the email sender 130 uses standard mail protocols, such as Simple Mail Transfer Protocol (SMTP) in order to deliver emails. These emails may be delivered to other domains, such as other email systems 120 on other domains, or to other recipients within the same domain (e.g., within the same organization).

The email sender 130 includes a message authentication method signer 132, which appends to the header of the email the authentication method of the user account which requested that the email be sent, and also includes a digital signature within the email header to authenticate this authentication method information email header element. When the email sender receives a request to send an email, the message authentication method signer 132 requests or receives the authentication method of the user account which made the request. A user account which makes a request to send an email is the user account that was accessed by an email client 152 to send an email with the email address associated with the user account as the sender of the email. As described above, a user authenticates to a user account via one or more authentication methods, and the authentication may be performed by the authentication system 154 and/or the server authentication system 130. The message authentication method signer 132 records the authentication method as an indicator and stores this indicator in the header of the email to be sent, as an authentication method header. The message authentication method signer 132 also generates a signature of the email header and includes this signature within the email to be sent. The signature ensures to a recipient of the email that the authentication method header information has not been tampered with during the transmission of the email. Additional details regarding the message authentication method signer 132 are described below with reference to FIG. 2.

The email system 120 also includes an email receiver 140 to receive emails. In one embodiment, the email receiver 140 uses standard mail protocols, such as Simple Mail Transfer Protocol (SMTP), to receive emails bound for addresses associated with a domain for which the email system 120 is associated. For example, this domain could be a domain stored in an MX record on a DNS system of an organization associated with the email system 120. Any emails which are addressed to this domain may be transmitted to the email system 120, and in response the email receiver 140 may process these emails. The email receiver 132, after receiving these emails, may process these emails and send them to an email storage location of a user associated with the recipient email address of the email (i.e., the address indicated in a "To" section of the email).

To process the emails, the email receiver 140 includes at least a message authentication method verifier 142 which retrieves any authentication method information email header element present in the email. The receiver 140 also verifies that the email header element has not been modified via the verification of the digital signature. If the verification of the header element fails, the message authentication method verifier 142 may associate a flag with the email to indicate that the email has failed a signature check of the authentication method information email header element. Otherwise, the message authentication method verifier 142 may determine the type of authentication method of the user account of the sender of the email, and may perform one or more actions (or no action) upon the email in response to a determined security level for the determined authentication method. For example, an email with an indicated authentication method that has a low security level may be transmitted to additional security checks to determine whether that email was actually sent by the user associated with the user account which requested the email to be sent, and not by a malicious user. As another example, the message authentication method verifier 142 may associate a flag with the email that indicates the security level. Additional details regarding the message authentication method verifier 142 are described below with reference to FIG. 3.

While many current email security measures ensure that an email is actually sent by the sender's user account indicated in the email, these security measures do not provide any information about how likely that sender's user account may have been hijacked by a malicious user. By including the authentication method of a sender's user account in an email using the tamper-evident method as described here, a recipient of an email can receive a level of protection against this type of hijacking by knowing the security level of the authentication method used to access the sender's user account. A higher level of security in the authentication method implies a lower chance of an account hijack, while a lower security level increases the chance of such a hijack. This information may further be used to determine additional actions to be taken against an email. Emails from sender accounts with high security may not require significant resources devoted to determining their trustworthiness, whereas these resources may be saved for analyzing emails which have a lower security level in their associated sender account authentication methods, thereby reducing computer resource usage as well.

Example Message Authentication Method Signer

Figure 2:
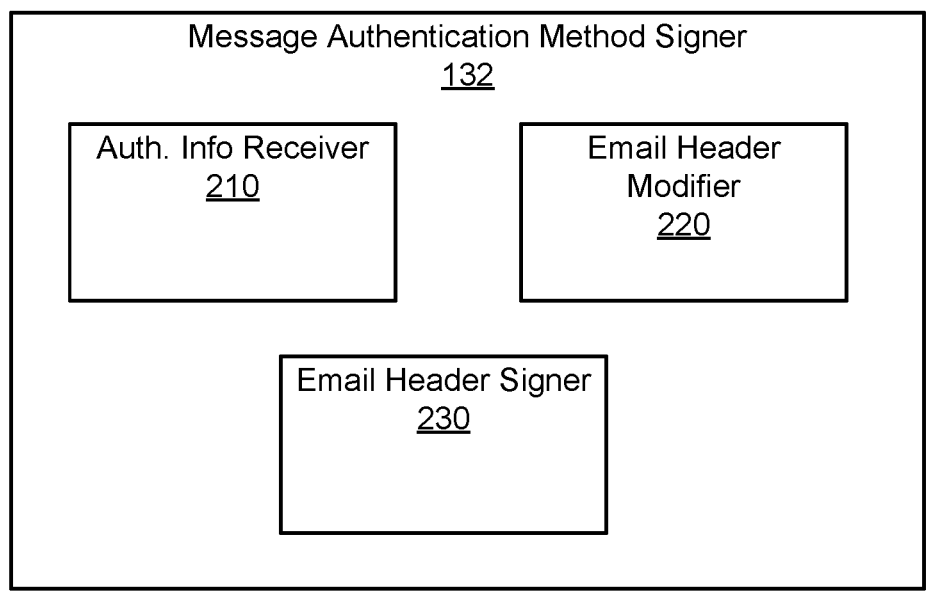
FIG. 2 is a detailed block diagram of the message authentication method signer of the email system of FIG. 1, according to one example embodiment.

FIG. 2 is a detailed block diagram of the message authentication method signer of the email system 120 of FIG. 1, according to one example embodiment. The message authentication method signer 132 includes an authentication information receiver 210, an email header modifier 220, and an email header signer 230. Although the illustrated message authentication method signer 132 includes the elements shown in FIG. 2, in other embodiments the message authentication method signer 132 may include different elements or a different number of elements. Furthermore, the functionalities of each element may be distributed differently among the elements in other embodiments.

Authentication Information Receiver

The authentication information receiver 210 receives authentication method information for an email that is to be sent. This authentication method information includes an indication describing the details of the authentication method of the user account which made the request to send the email. As described above, the authentication method includes one or more processes used to verify the identity of a user when the user accesses the user account. The authentication method information includes this authentication method, and may also include one or more configuration settings for the one or more authentication methods (e.g., password complexity requirements). When the user account requests that an email be sent, the authentication system 154 and/or server authentication system 130 may transmit information about the authentication method to the authentication information receiver 210. In another embodiment, the authentication information receiver 210 may request this information from the authentication system 154 and/or server authentication system 130. The authentication information receiver 210 may also retrieve the authentication method information from a local cache that is periodically updated from the authentication system 154 and/or server authentication system 130. After retrieving the authentication method information, the authentication information receiver 210 sends this information to the email header modifier 220 for inclusion in the email header of the email to be sent.

Email Header Modifier

The email header modifier 220 modifies the header of an email to be sent to include the authentication method information received by the authentication information receiver 210. A header of an email includes various metadata for the email, such as sender, recipient, subject line information, encoding. The header also may include security features, such as digital signatures, and so on. The email header modifier 220 converts the authentication method information to a standard format and inserts this standardized authentication method information as an entry into the email header of the email to be sent.

The email header modifier 220 may convert the authentication method information to a standard format based on a set of one or more rules that indicates a type of indicator, such as a text string, to use for each element of information received in the authentication method information. For example, the method may specify that the authentication method is to be indicated by a tag "m=" followed by a value selected from a standardized set of values corresponding to each authentication method that is supported by the standard format. The standard format may also support a value for other authentication methods that are not supported. Thus, for example, an authentication method that uses a fingerprint may be converted by the email header modifier 220 to a standard format of "m=fprint" indicating a fingerprint. Alternatively, the standard format may represent each authentication method using a code, which may be referenced in a lookup table. Thus, each authentication method may be converted to a code, which is then included in the standard format. For example, if the fingerprint authentication method is assigned a code of 5, then the standard format for this authentication type may be "m=5." Additional details regarding this standard format are described below with reference to FIG. 5, where a sample email header with authentication method information is illustrated.

Email Header Signer

The email header signer 230 signs at least the authentication method information that has been included in the email header by the email header modifier 220. The email header signer 230 may replace, or add in addition to, any existing signature present in the email. This signature is placed in the email header of the email.

To generate the signature, the email header signer 230 takes at least the authentication method information email header element, and generates a hash of that element (e.g., a SHA256 hash). This hash is encrypted via a private key (e.g., an RSA private key) by the email header signer 230. This private key is unique to the email system 120 which performs the signing and is also not known to any external entities. This encrypted hash is included by the email header signer 230 in the email header of the email to be sent. Upon receipt, the signature can be verified to determine whether the authentication method information email header element has been modified during transit. In one embodiment, the signing method is DKIM (DomainKeys Identified Mail). Additional details regarding the verification process is described below with reference to the header signature verifier 310 of FIG. 3.

Example Message Authentication Method Verifier

Figure 3:
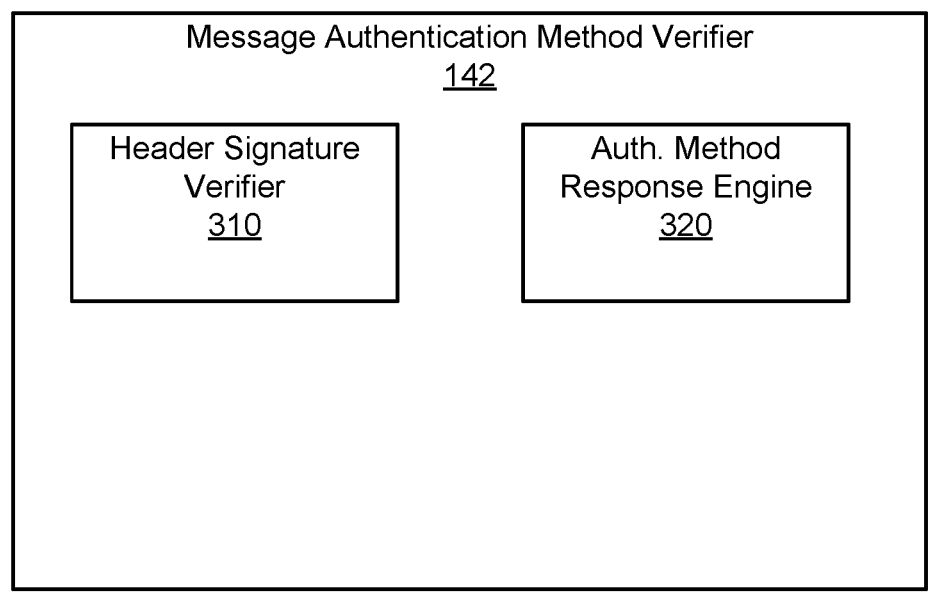
FIG. 3 is a detailed block diagram of the message authentication method verifier of the email system of FIG. 1, according to one example embodiment.

FIG. 3 is a detailed block diagram of the message authentication method verifier of the email system 120 of FIG. 1, according to one example embodiment. The message authentication method verifier 142 includes a header signature verifier 310 and an authentication method response engine 320. Although the illustrated message authentication method verifier 142 includes the elements shown in FIG. 3, in other embodiments the message authentication method verifier 142 may include different elements or a different number of elements. Furthermore, the functionalities of each element may be distributed differently among the elements in other embodiments.

Header Signature Verifier

The header signature verifier 310 verifies any authentication method information email header element using a corresponding signature in the email header of an email that is received. To verify the signature, the header signature verifier 310 retrieves a public key of the domain associated with the sender of the email. This public key may be stored in a public and verifiable location of the sender's domain, such as at a DNS (Domain Name System) record of the sender's domain. Using the public key, the header signature verifier 310 decrypts the signature to generate the hash, reversing the process performed by the email header signer 230 at the email system of the sender. The header signature verifier 310 continues by verifying that a hash of the authentication method information email header element (and any additional elements that are indicated to be included in the signature) matches the hash from the decrypted signature. If the header signature verifier 310 determines that the two hashes match, the header signature verifier 310 sends the email to the authentication method response engine 320 with an indication that the authentication method information email header element is verified. If the hash does not match, the header signature verifier 310 may also send the email to the authentication method response engine 320, but with a flag indicating that the authentication method information email header element did not verify correctly. The header signature verifier 310 may alternatively discard the email, transmit an alert to a system administrator, send a report (e.g., via a Domain-based Message Authentication Reporting and Conformance (DMARC) report) to the administrator or domain owner, or perform some other action in response.

Authentication Method Response Engine

The authentication method response engine 320 performs an action in response to the information provided in the authentication method information email header element that is received in an email by the email system 120. As described above, different types of authentication methods may imply different security levels, i.e., different likelihoods of a malicious user being able to hijack an account using that authentication method. Therefore, the authentication method response engine 320 may respond differently based on the security level of the authentication method indicated in the email. The authentication method response engine 320 may respond based on a response database, or may respond using one or more predictors based on historical data.

In one embodiment, the authentication method response engine 320 responds using a response database. These response database indicates, for each configuration of authentication method specified in the authentication method information email header element, a response and/or a security level indicated for that configuration of authentication method. The authentication method response engine 320 accesses the response database to find an entry in the response database matching the authentication method indicated in the authentication method information email header element, and if a match is found, the authentication method response engine 320 accesses the data associated with the matched entry in the response database. This data may indicate a response to be executed by the authentication method response engine 320 (or other entity) and/or a security level of the authentication method.

The authentication method information email header element may further indicate additional components, such as the configuration settings for the authentication method (e.g., retry limit), or an additional authentication method. The authentication method response engine 320 may further locate additional entries in the response database that match the additional components indicated in the authentication method email header element. The data associated with this additional entry in the response database may indicate a modification of the response to be executed or a modification of the indicated security level determined in the first entry that was matched for the authentication method (e.g., by adding to or subtracting from the initial security level). The authentication method response engine 320 may then execute the response prescribed by the response database. The authentication method response engine 320 may associate a flag with the email that indicates the security level of the email, according to the security level indicated in the response database. In one embodiment, the authentication method response engine 320 may only set a flag, and not execute any response.

In one example embodiment, the response database may include key value pairs, keyed according to the authentication method and/or configuration settings described above. In another embodiment, the response database may include a decision tree, with each leaf indicating a response to be executed and/or security level to be flagged (or other action or non-action to be take), and each node instructing the authentication method response engine 320 to determine whether a match exists in the authentication method information email header element with data indicated in the node, and which branch to follow if a match is found or not found.

In another embodiment, instead of using a response database, which may include preconfigured matches and responses, the authentication method response engine 320 analyzes historical data regarding hijacked accounts and their respective authentication methods to automatically determine a security score for each authentication method. The security score is used to determine the security level, which may be used to determine an appropriate response to execute.

To make this determination of the security score, the authentication method response engine 320 receives the input historical data. This historical data may describe an authentication method and a statistic regarding a number of security incidents associated with the authentication method, including, for example, account compromises, hijacks, data security breaches, unauthorized accesses, bad emails received, and so on. For example, the statistic may indicate a percentage of accounts (or account accesses) with an authentication method which had security incidents. As another example, the statistic may indicate a count of the number of incidents for an authentication method. As yet another example, the statistic may indicate a number of emails received from accounts with an authentication method that were marked as spam, marked as having malicious content, and/or marked as failing verification by email security software.

The authentication method response engine 320 uses this historical data to determine a security score for each authentication method relative to other authentication methods. Those with the most favorable statistics (e.g., indicating the least number of security incidents) may receive a highest score, while other authentication methods may receive a score proportional to this highest score according to their statistic. For example, an authentication method using a hardware token may receive a score of 100, while an authentication method using a fingerprint, which may have a statistic indicating five times as many associated security incidents as those for the hardware token authentication method, may receive a score that is five times less, i.e., 20.

In some cases, as described above, an authentication method for a user account may use multi-factor authentication, i.e., use multiple individual authentication methods, which must all succeed in verifying the user, before allowing the user access to the associated account. While the input historical data may have statistics for some of the combinations of multiple individual authentication methods, it may not have statistics for every possible combination. To generate a security score for these missing combinations, the authentication method response engine 320 may model the available input historical data to generate a score for the various combinations of multiple authentication methods. In one embodiment, the score for a combination of multiple authentication methods is generated by summing (or multiplying together) the scores for the individual authentication methods that make up the combination. In another embodiment, a base score is modified for each of the individual authentication methods by the deviation of the score of each of the individual authentication methods from a median or mean score of all authentication methods. Therefore, an authentication method with a low score may reduce the overall score of the combination, while a method with a high score may increase the overall score.

The authentication method response engine 320 may store these generated security scores in a lookup store, such as a cache. The authentication method response engine 320 may use this lookup store to determine the security score for an authentication method indicated in the authentication method information email header element by matching the authentication method indicated in the header element to the one stored in the lookup store and retrieving the corresponding security score.

The security score that is generated by the authentication method response engine 320 may further be modified based on additional components in the authentication method information email header element, such as the configuration settings, and so on.

The authentication method response engine 320 may also categorize a security score into one or more security levels, according to a range which the security score falls within. For example, a score from 0-33 (out of 100) may be categorized as low, while a score of 34-66 and 64-100 may be categorized as medium and high, respectively, with high security indicating a low likelihood of the authentication method having a security incident.

Depending upon the security level, the authentication method response engine 320 may execute a different response that is commiserate of the security level, i.e., a lower security level may warrant a stronger response versus a higher security level. In one embodiment, for a low security level, the authentication method response engine 320 performs one or more actions, such as set a warning flag to be associated with the email, discard the email, analyze the contents of the email using an email security system to detect for malicious activity, quarantine the email, and so on. In one example embodiment, for a medium security level, the authentication method response engine 320 sets a warning to be associated with the email. In one example embodiment, for a high security level, the authentication method response engine 320 associates an indicator with the email to indicate that it was sent by an account with a high security level and may not perform any other actions. In either of these security levels, the authentication method response engine 320 may additionally send a notice, alert, and/or report (e.g., via a DMARC report) to the administrator or domain owner regarding the results from the authentication method response engine 320, such as the authentication method that is determined and/or the response that is selected.

Figure 4:
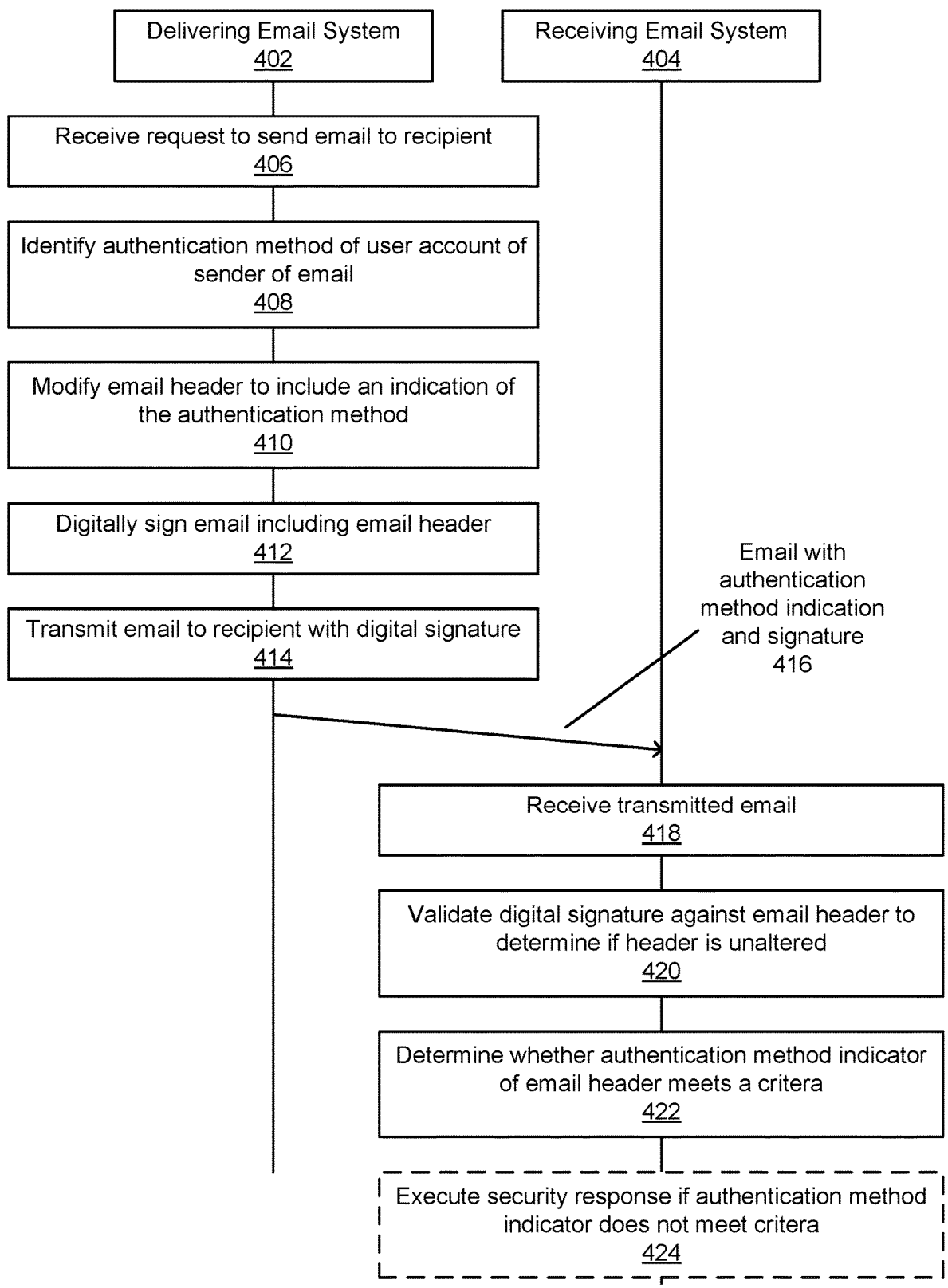
FIG. 4 is an interaction diagram illustrating an exemplary process for sending and receiving a signed message header storing an authentication method of a sender account of a message, according to one example embodiment.

Example Interaction Diagram for Sending Email with Authentication Method Header and Signature FIG. 4 is an interaction diagram illustrating an exemplary process for sending and receiving a signed message header storing an authentication method of a sender account of a message, according to one embodiment. In one embodiment, FIG. 4 attributes the operations in process to the indicated elements. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 624, that may be executed by the processor 602 described with respect to FIG. 6. Note that elements with dashed lines indicate optional elements that may not be performed or transmitted or which are performed or transmitted conditionally. In FIG. 4, two different email systems 120 are shown: 1) a delivering email system 402, and 2) a receiving email system 404. Both may operate in a similar fashion to the email system 120, and may each include an email sender 130, an email receiver 140, and the ability to add and verify email header elements that indicate the authentication method, as described above.

Initially, the delivering email system 402 receives 406 a request (e.g., from an email client 152) to send an email to a recipient (e.g., at an email sender 130). The delivering email system 402 identifies 408 (e.g., via an authentication information receiver 210) an authentication method of the user account of the sender of the email. The delivering email system 402 modifies 410 (e.g., via an email header modifier 220) the email header of the email to include an indication of the authentication method used. For example, the email header may be modified to include the authentication method information email header element as described above.

The delivering email system 402 further digitally signs 412 the email, with the signature including the email header and the authentication method information (e.g., via the email header signer 230). The delivering email system 402 transmits 414 the email 416 to the indicated recipient with the digital signature and the header information indicating the authentication method.

At the domain associated with the recipient of the email, a receiving email system 404 receives 418 the transmitted email (e.g., via an email receiver 140). The receiving email system 404 validates 420 the digital signature included in the email against the email header to ensure that the email header is unaltered (e.g., via a header signature verifier 310). This ensures that the header information including the authentication method of the sender's account has not been modified in transit. The receiving email system 404 determines 422 if the authentication method indicated in the header meets a criteria (e.g., a security level). If it does, no action may be executed. Otherwise (e.g., if the security level for the authentication method is too low), the receiving email system 404 may execute a security response against the email (e.g., via an authentication method response engine 320).

Example Email Header with Authentication Method Information Element

FIG. 5 is an example of a message header including a digital signature and a header element indicating the authentication method of the sender's account, according to one embodiment.

The message header with message body shown in FIG. 5 only illustrates one example of a message header with an authentication method email header element. The various headers and message body are meant to be illustrative only. Therefore, the authentication method email header element may appear in alternative formats and with other combinations of email headers, rather than the ones shown.

In the illustrated embodiment, the authentication method email header element may be indicated by an "X-Security" header element, as shown in bold in the illustrated message header. The "X-Security" header element may include various tags, such as those illustrated here, and may include additional tags, each separated by a text delimiter. Although the tags and header name illustrated here are composed of specific text and formatting, in other embodiments these tags may be composed differently, although indicate the same meaning.

The first tag shown (from left to right) is a "v=" tag indicating the version number of the standard format of the authentication method email header element being used. In this case, the version is "1".

The second tag shown is an "m=" and indicates the authentication method used by the sender's user account. The authentication method may be indicated by a code, such a numerical value, or by a short text string. Here, the value for this tag is "2fa," indicating that the authentication method is two-factor authentication. However, in other cases, the value for this tag may indicate a specific authentication method, if a multi-factor authentication method is not used. For example, the value may indicate "iris" for an iris scan biometric authentication method.

The third and fourth tags indicate the two different authentication methods (i.e., the two factors) used in the two-factor authentication specified in the second tag. The first method is tagged as "f1=", while the second is tagged as "f2=". If more than two factors were used (and therefore specified in the second tag), additional tags here, such as "f3=", "f4=", and so on, may be used. Conversely, if only one factor were used, these "f" tags may not be present, as the authentication method may be directly specified using the "m=" tag. The "f1=" tag indicates that one of the authentication methods used is "pass" or password authentication. The "f2=" tag indicates that the second authentication method is an RSA token (i.e., a hardware token).

The authentication method information email header element may also include additional information regarding the configuration settings and limitations for the authentication system of the sender's account. These may be indicated by the tags labeled "c1=" "c2=", and so on. The "c1=" tag indicates that the authentication system of the sender has a retry limit, and this retry limit is indicated by the "retry=" tag to 5. The "c2=" tag indicates that the system also includes a password complexity setting, with the "pass_complex1=" tag indicating a complexity requiring uppercase characters ("upper") and numbers ("num"). Each requirement is separated by a delimiter. This additional configuration information may be used to further modify a security score or security level and to determine an appropriate security response from the system.

The message header also includes a signature of the "X-Security" header, as described above. In the illustrated example, this signature is a DKIM signature, as indicated in bold. The DKIM signature includes the signature of header elements of the email message that are specified in the "h=" tag. As shown, the "h=" tag includes various header elements, including an entry for "x-security," indicating that the "x-security" header is included in the signature following the "bh=" tag. Note that the actual signature has been omitted for sake of clarity in the illustrated example and replaced with a placeholder ("[signature]"). The receiving email system may verify this signature against the "X-Security" header to verify that it has not been altered during transit, in the methods described above.

Example Machine Architecture

Figure 6:
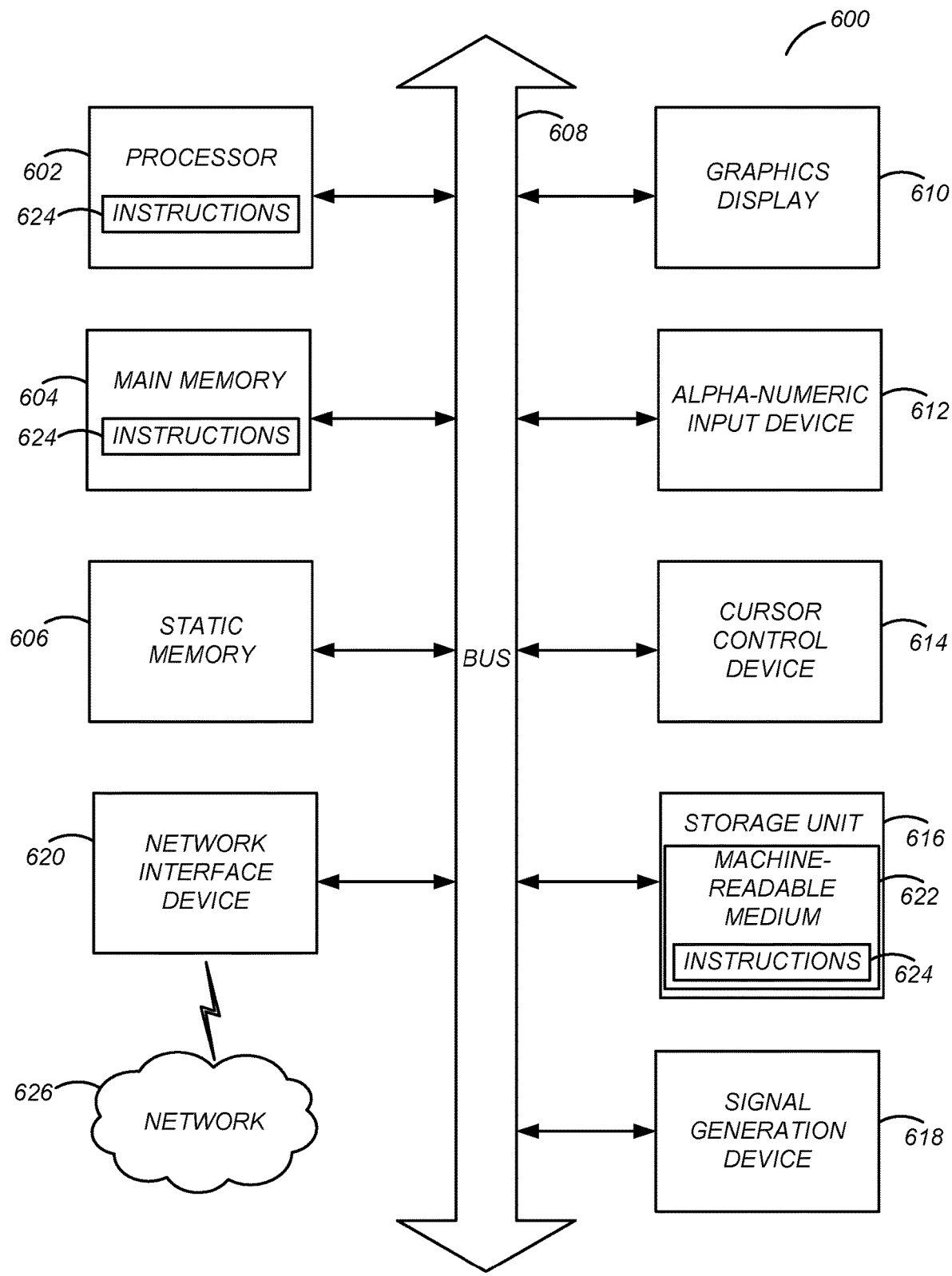
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) or functions described herein, for example, in FIGS. 1-5. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

Example benefits (or advantages) of the disclosed configurations include the ability to validate emails. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium and executable by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system to send and receive emails with authentication method information email header elements. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system, comprising:
a delivering email system configured to:
  receive a request from a sender to send an email to a recipient;
  identify an authentication method of a sender account for the email;
  convert information of the authentication method to a standard format based on a set of one or more rules that indicates a type of indicator to use for each element of the information of the authentication method, wherein the standard format is based on a lookup table, the lookup table indicating a value for each authentication method;
  modify one or more email headers of the email to include an indication of the authentication method, one of the email headers including the authentication method information in the standard format;
  generate one or more digital signatures for the email that include the one or more email headers within a scope of the one or more digital signatures;

modify the email such that an email header of the email includes the one or more digital signatures; and transmit the email, including the indication of the authentication method and the one or more digital signatures, to the recipient at a receiving email system; and the receiving email system configured to:

receive the email having the one or more email headers indicating the authentication method of a sender account of the email and the one or more digital signatures of the one or more email headers;

determine that the one or more email headers are unaltered by validating the one or more digital signatures against a public key of a sender domain of the email;

determine whether the authentication method indicated in the one or more email headers meets a criteria; and execute, in response to the authentication method failing the criteria, a security response against the email.

2. The system of claim 1, wherein the authentication method comprises at least one of: 1) entering a username and password, 2) entering a key from a token, 3) entering a key provided by an external security system, 4) retrieving authentication credentials from a password vault, 5) answering one or more questions, 7) using a hardware or software authentication device, 8) using a certificate file, 9) submitting biometric information, 10) a challenge/response protocol, and any combination thereof.

3. The system of claim 1, wherein the receiving email system is further configured to:

associate, in response to a determination that the one or more email headers are altered by validating the one or more digital signatures against a public key of the sender domain of the email, a flag with the email indicating that the email failed the validation of the one or more digital signatures.

4. The system of claim 1, wherein the receiving email system is further configured to:

send, in response to a determination that the one or more email headers are altered by validating the one or more digital signatures against a public key of the sender domain of the email, an alert to a system administrator.

5. The system of claim 1, wherein the authentication method meets the criteria when a security level of the authentication method is above a threshold level, the security level indicating a likelihood of the authentication method being compromised by a malicious attacker.

6. The system of claim 1, wherein the security response includes additional security checks to determine whether the email was actually sent by a user associated with a user account indicated in a sender address of the email.

7. The system of claim 1, wherein the indication of the authentication method further includes an indication of one or more configuration settings associated with the authentication method, the one or more configuration settings indicating at least one of: 1) a maximum limit on the number of retries, 2) mandatory delay period between retries, 3) a time of day in which user authentication is allowed, 4) whether each authentication attempt is logged, 5) complexity requirements for the authentication method, and 6) expiry periods, and wherein the security response is modified based on the indication of the one or more configuration settings.

8. The system of claim 1, wherein the delivering email system is further configured to:

generate a hash of the one or more email headers that includes the indication of the authentication method; and encrypt the hash with a private key to generate the one or more digital signatures, wherein the hash can be decrypted using a public key stored at a publicly verifiable location of the sender domain of the delivering email system.

9. The system of claim 1, wherein the receiving email system is further configured to:

access the public key of the delivering email system from a publicly verifiable location;

decrypt the one or more digital signatures using the public key to generate an unverified hash; and match the unverified hash against a currently generated hash of the one or more email headers of the email to determine that the one or more email headers, including the indication of the authentication method, is unaltered.

10. The system of claim 9, wherein the digital signature is further generated of a body of the email, and wherein the receiving email system is further configured to:

match the unverified hash against a currently generated hash of the body of the email to determine that the body of the email is unaltered.

11. The system of claim 1, wherein the receiving email system is further configured to:

access a response database that stores one or more security responses for each authentication method;

select the one or more security responses in the response database associated with the one or more authentication methods indicated in the email header; and execute the selected one or more security responses.

12. The system of claim 1, wherein the receiving email system is further configured to:

access a database of security scores, each security score in the database associated with a selected authentication method, the database generated by:

analyzing historical data indicating hijacked user email accounts and selected authentication methods associated with those user email accounts;

assigning a security score to the selected authentication method based on a number of hijacked user email accounts that are associated with the selected authentication method; and determine a security score associated with the authentication method indicated in an email header element; and select the security response for execution based on a value of the security score.

13. A computer implemented method, comprising:

receiving a request from a sender to send an email to a recipient;

identifying an authentication method of a sender account for the email;

converting information of the authentication method to a standard format based on a set of one or more rules that indicates a type of indicator to use for each element of the information of the authentication method, wherein the standard format is based on a lookup table, the lookup table indicating a value for each authentication method;

modifying one or more email headers of the email to include an indication of the authentication method, one of the email headers including the authentication method information in the standard format;

generating one or more digital signatures for the email that includes the one or more email headers within a scope of the one or more digital signatures;

modifying the email such that an email header of the email includes the one or more digital signatures; and transmitting the email, including the indication of the authentication method and the one or more digital signatures, to the recipient.

14. The method of claim 13, further comprising:

generating a hash of the one or more email headers that includes the indication of the authentication method; and encrypting the hash with a private key to generate the one or more digital signatures, wherein the hash can be decrypted using a public key stored at publicly verifiable location of a sender domain.

15. A computer implemented method, comprising:

receiving an email having one or more email headers indicating an authentication method of a sender account of the email and one or more digital signatures of the one or more email headers;

determining that the one or more email headers are unaltered by validating the one or more digital signatures against a public key of a sender domain of the email;

determining whether the authentication method indicated in the one or more email headers meets a criteria;

accessing a database of security scores, each security score in the database associated with a selected authentication method;

determining a security score associated with the authentication method indicated in an email header element; and executing, in response to the authentication method failing the criteria, a security response against the email, wherein the security response is further based on a value of the security score.

16. The method of claim 15, further comprising:

associating, in response to a determination that the one or more email headers are altered by validating the one or more digital signatures against a public key of the sender domain of the email, a flag with the email indicating that the email failed the validation of the one or more digital signatures.

17. A non-transitory computer readable storage medium, comprising instructions, that when executed by a processor, cause the processor to perform the operations of:

receiving a request from a sender to send an email to a recipient;

identifying an authentication method of a sender account for the email;

converting information of the authentication method to a standard format based on a set of one or more rules that indicates a type of indicator to use for each element of the information of the authentication method, wherein the standard format is based on a lookup table, the lookup table indicating a value for each authentication method;

modifying one or more email headers of the email to include an indication of the authentication method, one of the email headers including the authentication method information in the standard format;

generating one or more digital signatures for the email that include one or more email headers within a scope of the one or more digital signatures;

modifying the email such that an email header of the email includes the one or more digital signatures; and transmitting the email, including the indication of the authentication method and the one or more digital signatures, to the recipient.

18. The non-transitory computer readable storage medium of claim 17, comprising instructions, that when executed by a processor, cause the processor to perform the operations of:

generating a hash of the one or more email headers that includes the indication of the authentication method; and encrypting the hash with a private key to generate the one or more digital signatures, wherein the hash can be decrypted using a public key stored at publicly verifiable location of the sender domain of the delivering email system.

19. A non-transitory computer readable storage medium, comprising instructions, that when executed by a processor, cause the processor to perform the operations of:

receiving an email having one or more email headers indicating an authentication method of a sender account of the email and one or more digital signatures of the one or more email headers;

determining that the one or more email headers are unaltered by validating the one or more digital signatures against a public key of a sender domain of the email;

determining whether the authentication method indicated in the one or more email headers meets a criteria;

accessing a database of security scores, each security score in the database associated with a selected authentication method;

determining a security score associated with the authentication method indicated in an email header element; and executing, in response to the authentication method failing the criteria, a security response against the email, wherein the security response is further based on a value of the security score.

20. A system, comprising:

a delivering email system configured to:
  receive a request from a sender to send an email to a recipient;
  identify an authentication method of a sender account for the email;
  modify one or more email headers of the email to include an indication of the authentication method;
  generate a hash of the one or more email headers that includes the indication of the authentication method; and
  encrypt the hash with a private key to generate one or more digital signatures for the email that include the one or more email headers within a scope of the one or more digital signatures, wherein the hash can be decrypted using a public key stored at publicly verifiable location of a sender domain of the delivering email system;
  modify the email such that an email header of the email includes the one or more digital signatures; and
  transmit the email, including the indication of the authentication method and the one or more digital signatures, to the recipient at a receiving email system; and the receiving email system configured to:
  receive the email having the one or more email headers indicating the authentication method of a sender account of the email and the one or more digital signatures of the one or more email headers;

determine that the one or more email headers are unaltered by validating the one or more digital signatures against a public key of the sender domain of the email;

determine whether the authentication method indicated in the one or more email headers meets a criteria; and execute, in response to the authentication method failing the criteria, a security response against the email.

21. The system of claim 20, wherein the authentication method comprises at least one of: 1) entering a username and password, 2) entering a key from a token, 3) entering a key provided by an external security system, 4) retrieving authentication credentials from a password vault, 5) answering one or more questions, 7) using a hardware or software authentication device, 8) using a certificate file, 9) submitting biometric information, 10) a challenge/response protocol, and any combination thereof.

22. The system of claim 20, wherein the receiving email system is further configured to:

associate, in response to a determination that the one or more email headers are altered by validating the one or more digital signatures against a public key of the sender domain of the email, a flag with the email indicating that the email failed the validation of the one or more digital signatures.

23. The system of claim 20, wherein the receiving email system is further configured to:

send, in response to a determination that the one or more email headers are altered by validating the one or more digital signatures against a public key of the sender domain of the email, an alert to a system administrator.

24. The system of claim 20, wherein the authentication method meets the criteria when a security level of the authentication method is above a threshold level, the security level indicating a likelihood of the authentication method being compromised by a malicious attacker.

25. The system of claim 20, wherein the security response includes additional security checks to determine whether the email was actually sent by a user associated with a user account indicated in a sender address of the email.

26. The system of claim 20, wherein the indication of the authentication method further includes an indication of one or more configuration settings associated with the authentication method, the one or more configuration settings indicating at least one of: 1) a maximum limit on the number of retries, 2) mandatory delay period between retries, 3) a time of day in which user authentication is allowed, 4) whether each authentication attempt is logged, 5) complexity requirements for the authentication method, and 6) expiry periods, and wherein the security response is modified based on the indication of the one or more configuration settings.

27. The system of claim 20, wherein the receiving email system is further configured to:

access a response database that stores one or more security responses for each authentication method;

select the one or more security responses in the response database associated with the one or more authentication methods indicated in the email header; and execute the selected one or more security responses.

28. The system of claim 20, wherein the receiving email system is further configured to:

access a database of security scores, each security score in the database associated with a selected authentication method, the database generated by:

analyzing historical data indicating hijacked user email accounts and selected authentication methods associated with those user email accounts;

assigning a security score to the selected authentication method based on a number of hijacked user email accounts that are associated with the selected authentication method; and determine a security score associated with the authentication method indicated in an email header element; and select the security response for execution based on a value of the security score.

29. A computer implemented method, comprising:

receiving a request from a sender to send an email to a recipient;

identifying an authentication method of a sender account for the email;

modifying one or more email headers of the email to include an indication of the authentication method;

generating a hash of the one or more email headers that includes the indication of the authentication method; and encrypting the hash with a private key to generate one or more digital signatures for the email that include the one or more email headers within a scope of the one or more digital signatures, wherein the hash can be decrypted using a public key stored at publicly verifiable location of a sender domain;

modifying the email such that an email header of the email includes the one or more digital signatures; and transmitting the email, including the indication of the authentication method and the one or more digital signatures, to the recipient.

30. The method of claim 29, further comprising:

associating, in response to a determination that the one or more email headers are altered by validating the one or more digital signatures against a public key of the sender domain of the email, a flag with the email indicating that the email failed the validation of the one or more digital signatures.

31. The method of claim 29, further comprising:

sending, in response to a determination that the one or more email headers are altered by validating the one or more digital signatures against a public key of the sender domain of the email, an alert to a system administrator.

32. The method of claim 29, wherein the authentication method meets a criteria when a security level of the authentication method is above a threshold level, the security level indicating a likelihood of the authentication method being compromised by a malicious attacker.

33. The method of claim 29, wherein the security response includes additional security checks to determine whether the email was actually sent by a user associated with a user account indicated in a sender address of the email.

34. The method of claim 29, further comprising:

accessing a response database that stores one or more security responses for each authentication method;

selecting the one or more security responses in the response database associated with the one or more authentication methods indicated in the email header; and executing the selected one or more security responses.

35. A method of claim 29, further comprising:

access a database of security scores, each security score in the database associated with a selected authentication method, the database generated by:

analyzing historical data indicating hijacked user email accounts and selected authentication methods associated with those user email accounts;

assigning a security score to the selected authentication method based on a number of hijacked user email accounts that are associated with the selected authentication method; and determine a security score associated with the authentication method indicated in an email header element; and select a security response for execution based on a value of the security score.

36. A system, comprising:

a delivering email system configured to:
 receive a request from a sender to send an email to a recipient;
 identify an authentication method of a sender account for the email;
 modify one or more email headers of the email to include an indication of the authentication method;
 generate one or more digital signatures for the email that include the one or more email headers within a scope of the one or more digital signatures;
 modify the email such that an email header of the email includes the one or more digital signatures; and
 transmit the email, including the indication of the authentication method and the one or more digital signatures, to the recipient at a receiving email system; and the receiving email system configured to:
 receive the email having the one or more email headers indicating the authentication method of a sender account of the email and the one or more digital signatures of the one or more email headers;
 determine that the one or more email headers are unaltered by validating the one or more digital signatures against a public key of a sender domain of the email;
 determine whether the authentication method indicated in the one or more email headers meets a criteria;
 access a database of security scores, each security score in the database associated with a selected authentication method;
 determine a security score associated with the authentication method indicated in an email header element; and
 execute, in response to the authentication method failing the criteria, a security response against the email, wherein the security response is further based on a value of the security score.

37. The system of claim 36, wherein the receiving email system is further configured to:
 associate, in response to a determination that the one or more email headers are altered by validating the one or more digital signatures against a public key of the sender domain of the email, a flag with the email indicating that the email failed the validation of the one or more digital signatures.

38. The system of claim 36, wherein the receiving email system is further configured to:
 send, in response to a determination that the one or more email headers are altered by validating the one or more digital signatures against a public key of the sender domain of the email, an alert to a system administrator.

39. The system of claim 36, wherein the authentication method meets the criteria when a security level of the authentication method is above a threshold level, the security level indicating a likelihood of the authentication method being compromised by a malicious attacker.

40. The system of claim 36, wherein the security response includes additional security checks to determine whether the email was actually sent by a user associated with a user account indicated in a sender address of the email.

41. The system of claim 36, wherein the receiving email system is further configured to:
 access a response database that stores one or more security responses for each authentication method;
 select the one or more security responses in the response database associated with the one or more authentication methods indicated in the email header; and
 execute the selected one or more security responses.

42. The system of claim 36, wherein the receiving email system is further configured to:
 access a database of security scores, each security score in the database associated with a selected authentication method, the database generated by:
  analyzing historical data indicating hijacked user email accounts and selected authentication methods associated with those user email accounts;
  assigning a security score to the selected authentication method based on a number of hijacked user email accounts that are associated with the selected authentication method; and
 determine a security score associated with the authentication method indicated in the email header element; and
 select the security response for execution based on a value of the security score.

43. A non-transitory computer readable storage medium, comprising instructions, that when executed by a processor, cause the processor to perform the operations of:
 receiving a request from a sender to send an email to a recipient;
 identifying an authentication method of a sender account for the email;
 modifying one or more email headers of the email to include an indication of the authentication method;
 generating a hash of the one or more email headers that includes the indication of the authentication method; and
 encrypting the hash with a private key to generate one or more digital signatures for the email that include the one or more email headers within a scope of the one or more digital signatures, wherein the hash can be decrypted using a public key stored at publicly verifiable location of a sender domain;
 modifying the email such that an email header of the email includes the one or more digital signatures; and
 transmitting the email, including the indication of the authentication method and the one or more digital signatures, to the recipient.

* * * * *